Aug. 18, 1936.  R. H. C. MARTY  2,051,729
MEANS FOR REPRODUCING SOUND FROM AND RE-RECORDING SOUND FILMS
Filed Sept. 2, 1933
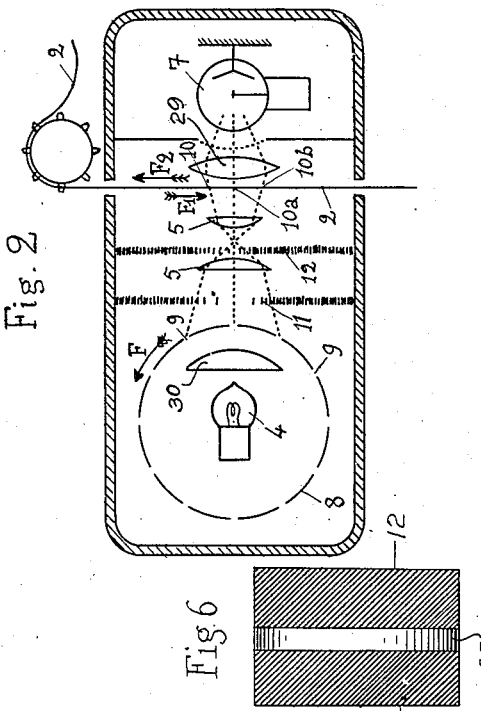
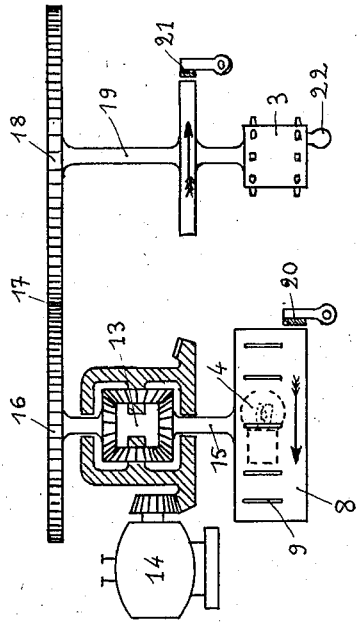
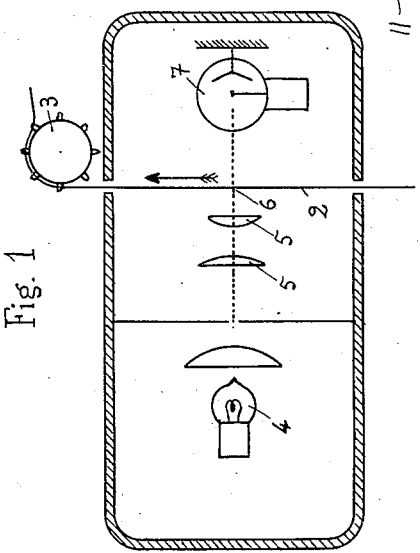
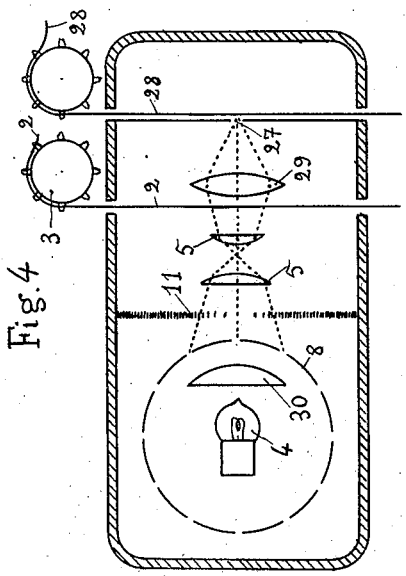
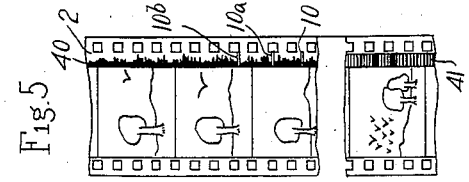
R. H. C. Marty
INVENTOR
By Marks & Clerk
ATTYS Patented Aug. 18, 1936

2,051,729

UNITED STATES PATENT OFFICE 2,051,729

MEANS FOR REPRODUCING SOUND FROM AND RE-RECORDING SOUND FILMS

René Henri Charles Marty, Sevres, France

Application September 2, 1933, Serial No. 688,038
In France September 3, 1932

9 Claims. (Cl. 274—5)

It is generally known that it is practically impossible to recognize the sound recorded on a sound film or the sound band of a cinematographic film without employing an apparatus called a sound head in which the image of a luminous slot is projected on to a moving film which must be fed at a predetermined velocity and that the sound is intelligible only when the velocity is very close to the velocity of recording, as the slightest difference of velocity results in a variation of frequency, and consequently the pitch and timbre, or set of harmonics, which distinguish a musical instrument from another one are modified. All trick effect studios are aware of the difficulty experienced in picking out exactly the sounds recorded on sound films so as to synchronize them approximately with the cinematographic pictures.

It has been previously suggested, in order to avoid such difficulties, to provide a special sound head disposed in such a manner that, whatever be the velocity selected for the passage of the film through the sound head, the pitch and timbre of the sound remains unaltered. None of the known devices, however, permits of solving the problem in the same manner. Devices have been proposed, for instance, in which the light from a continuous source, after passing through the film, falls on a scanning device which allows the passage towards the photoelectric cell of only those beams which pass through certain points of the sound film. In such devices, however, the luminous spot skips from one point to another, which causes a shock to the ear, due to the lack of coincidence of the vibration phases of the successive emissions and the discontinuity of the fluctuations of light. It has been suggested to cause the spot partly to be hidden progressively by the oblique edge of an aperture, but the same effect arises as in the well known case of "overpassing" i. e. when, the amplitude of vibrations being too great, the vibrations pass beyond the border of the sound tracing and are thus truncated.

The object of the present invention is to avoid a series of shocks in rapid succession or hoarse noises and to permit of distinguishing vowels from one another.

In another known device, part of the film is disposed around a drum about the axis of which rotates an arm carrying an electric lamp on the opposite side of the film from a photoelectric cell. Successive points of the film are thus swept by a moving beam of light falling on the photoelectric cell. Such a device allows the film to be swept only by a single beam of light, which, by passing constantly over the same part of the film causes a sort of stuttering, which is not in the least similar to the utterance of the original sound at very slow speed, but which actually permits of identifying any point of the sound track of the film. The present invention has a more extensive object which is both to identify any point of the sound track and reproduce the corresponding sound at slow speed of the film.

According to the present invention, sound is reproduced from a sound film moving at a slow speed or stopped, without modifying the pitch or the timbre of the recorded sounds, by means of light spots moving on the film at a relative speed equal to the speed of the film when the sounds were recorded, by projecting a plurality of light spots simultaneously onto the film and causing them to pass successively over a limited portion of the films, the sounds thus produced being blended together and the appearance and disappearance of the images being rendered progressive by continuous variation of the amount of light projected onto each spot per unit of area thereof from zero to a maximum, and then back to zero.

In the accompanying drawing: Figure 1 shows a sound head of the known type, Figures 2 and 3 show respectively a section and a plan view of an embodiment of the invention. Figure 4 illustrates an example of a modification of the device for re-recording at modified speed. Figure 5 shows a portion of film having cinematographic pictures and sound records of two different sorts. Fig. 6 illustrates a form of the screen.

The device usually employed for reproducing recorded sounds comprises, as shown in Figure 1, a sprocket wheel 3 round which passes a film 2 which bears a sound record or a sound record and cinematographic pictures (Fig. 5), the sound record may be either of the variable width type (40) or of the variable intensity type (41). A lamp 4 projects light on to the optical system 5 which projects a light beam on to film 2 at 6. The light passing at 6 through the record on the film 2 acts on a photoelectric cell 7 and said cell causes a variation of current corresponding with the variation of light intensity through the sound record.

Under such conditions, it is a known fact that the film must move with respect to the stationary image 6 at a constant speed equal to the speed at which the film 2 moved when the sounds were recorded thereon. Any variation of speed of the film immediately causes a change of pitch of the sounds and prevents identification of the sounds reproduced.

In the device according to the invention illustrated by way of example in Figures 2 and 3, the velocity of the film 2 relatively to the spot 6 is rendered equal to that of said film when the sounds were recorded, although the film is fed at any rate whatever, for instance at reduced speed. For this purpose the lamp 4 is placed within a rotary drum formed with slits 9 so that the optical system 5 projects spots i. e. images of the slits at 10, 10a, and 10b moving on the film 2 (see also Fig. 5). Preferably a lens 30 is interposed between lamp 4 and slits 9 to concentrate the light from the lamp 4 through the slits 9 in the direction of the optical system 5.

Drum 8 is rotated in the direction of the arrow F by any appropriate means such that the speed of the movement of spots 10, 10a, 10b added to the speed at which the film 2 is moved in the direction of the arrow F2 shall be constant and equal to the speed at which the sounds were recorded on the film, the result being that the variations of the effects produced on cell 7 occur at said recording speed, and consequently the reproduced sounds have the same pitch as those which were recorded on the film 2.

Figure 3 shows means for maintaining constant speed of movement of the images 10, 10a, 10b relatively to the speed of the film 2. These means comprise a differential gear 13 driven by a constant speed electric motor 14, and the second pair of wheels of which transmit movement respectively to a shaft 15 carrying the drum 8 and to a shaft 19 carrying the sprocket wheel 3 through gear wheels 16, 17 and 18.

Devices comprising a slotted rotary drum and a differential gear have been employed already to cause a luminous spot to move relatively to a film at a speed equal to recording speed, but only one image was projected on the film at a time so that the sound reproduced was discontinuous. This is avoided by the present device wherein a plurality of images 10, 10a, 10b fall on the cell 7 simultaneously. Moreover transparent screens 11, 12 (Figs. 2, 6) of variable opacity are interposed between the drum 8 and the film 2. For instance, as shown in Fig. 7 the plate or film 35 is made more transparent in its center part than at its edges.

The opacity of these screens increases from the center towards the edges, so that whilst the intensity of the image 10b diminishes as it moves from the center of the illuminated portion of the film to the point at which it disappears, the intensity of the next image 10, increases from the point at which it first appears on the film to said center. Consequently the intensity of the light passing through the film due to the image 10b diminishes as said image passes from the center to the point of disappearance, and the reproduction of sound due to that light correspondingly diminishes. In the meantime and similarly, the reproduction caused by the image 10a increases since the intensity of said image increases as it passes from the point of entrance on the film to the centre of the illuminated portion thereof. The total amount of the intensity of the two images is thus practically constant so that the total amount of light passing on to the photo cell 7 is constant when there is no modulation on the film. Moreover, the reproductions of sound due to the two images are partially superposed, and experiments show that this partial superposition produces continuity of the reproduced sound and is essential for the latter to be acceptable by the human ear. This effect is rendered more perfect as a third image 10 operates similarly and its action is partially superposed to that of the images 10b, 10a, during a portion of their travel on the film.

The operator can either stop the drum 8 by means of a brake 20 thus compelling the film to pass through the device at recording speed, or he can release the brake 20 and apply a brake 21 thus reducing the speed of the film down to zero, if necessary, thus compelling the drum 8 to turn at such a speed that the images 10, 10a and 10b move at an absolute speed equal to the recording speed.

The obtainment of the constant flow of light when there is no modulation produced by the film permits of obtaining a clear and comprehensive reproduction of the sound at slow speed. The pitch and "timbre" of the sound obtained are the same as those of the sound that was recorded on the film 2. Only the speed at which the sound is reproduced is modified. This is due to the partial superposition of the two or three reproductions caused by the images 10b, 10a, 10, with a very short phase displacement between them. As the lapse of time between such reproductions is extremely short, the ear perceives only one impression, so that the different vibrations constituting a continuous sound do not give on the human ear separate impressions but a single impression as a whole, and there is no shock because one image such as 10b travels fully on the illuminated portion of the film but does not disappear abruptly just when the following image such as 10a begins to travel on said portion, which avoids hoarse sounds and permits of recognizing vowels even when the film is stopped.

The present invention can be applied in different manners, for example the current from the cell 7 instead of passing through an amplifier and a loud speaker so as to reproduce the sound recorded on the film 2, can be passed through a mixer to a recorder. The original sound recorded on the film 2 can thus be received on a second film and recorded thereon, but at a different speed since the speed of the emission of sound caused by the film 2 has been modified by the device described owing to the action of the rotary drum 8. By changing the speed of rotation of the latter during the passage of light through the film 2, the speed of recording on the second film may be rendered variable.

Such re-recording can be obtained also without electric connections by the means shown in Figure 4. The photo-cell 7 of Figure 2 is omitted. The lens 29 (also shown in Figure 2) concentrates the light rays passing through the film 2 onto an opening 27 in a diaphragm behind which passes a second film 28. The light rays modulated by the record on the film 2 impress the film 28 so as to produce re-recording on the latter, and as previously explained, the pitch and "timbre" of the sound that was recorded on the film 2 remain unaltered on the fresh record on the film 28, but the speed is modified by the action of the rotary drum 8 as hereinbefore described.

It is also well known, in devices similar to that shown in Figure 1, to substitute the lamp and cell for each other, and this can also be done in the devices shown in Figure 2 the lamp being placed at 7, and the cell at 4. In this case the lamp placed at 7 illuminates the film 2. Of all the illuminated parts of the film, only that which corresponds with the image of a slit 9 transmits light usefully to the cell placed at 4. The other rays are intercepted by the opaque parts of the drum 8 and those which fall on the cell placed at 4 have the same path, but in an inverse sense, as in the case of the apparatus previously described with reference to Figure 2. The combined effect of these rays on the cell produce the same result as in said apparatus.

The sound head constituted by the drum 8, sprocket wheel 3 and parts connected therewith are employed, as in similar devices, either with a synchronizer, a projector, a talking film, mixer, cutting machine, etc.

What I claim is:

1. A device for reproducing sounds from a film record, which comprises in combination, a source of light, means for guiding a portion of the film record with respect to said source of light, means for causing a plurality of light rays from said source to travel simultaneously behind one another along a limited length of said portion of the record with a relative speed equal to the normal rate of feed of the film, and means for varying the amount of light projected onto each spot per unit of area thereof by said respective rays in such manner that the total luminous flux received by said length of the film record is constant.

2. A device for reproducing sounds from a sound record, which comprises in combination, a source of light, means for guiding a portion of the film record with respect to said source, means for causing a plurality of light rays from said source to travel simultaneously behind one another along a limited length of said portion of the record with a relative speed equal to the normal speed of unwinding of the film, and at least one screen of nonuniform opacity interposed between said source and said portion of the film for varying the luminous intensity of the light spots produced by said respective rays on said record in such manner that the total luminous flux received by said length of the film record is constant.

3. A device for reproducing sounds from a film record, which comprises in combination, a source of light, means for feeding said film record with respect to said source of light, means for causing a plurality of light rays from said source to travel simultaneously behind one another along a limited length of said record, means for varying the amount of light projected onto each of these spots per unit of area thereof in such manner that the total luminous flux received by said length of the film record is constant, and differential means for interconnecting the two first mentioned means so that the light spots produced by the light rays on the record travel with a relative speed at least equal to the normal rate of feed of the film.

4. A device for reproducing sounds from a film record, which comprises in combination, a source of light, an opaque member provided with a plurality of slots, means for causing the images of the slots lighted by said source of light to travel simultaneously behind one another along a limited length of said record, means for varying the amount of light projected onto each of these spots per unit of area thereof in such manner that the total luminous flux received by said length of the record is constant, means for feeding the film and differential means for connecting the two above mentioned means so that said images of the slots travel along said record with a relative speed equal to the normal rate of feed of the film.

5. A device for reproducing sounds from a film record, which comprises in combination, a source of light, an opaque member provided with a plurality of slots, means for causing the images of the slots lighted by said source of light to travel simultaneously behind one another along a limited length of said record, means for feeding the film, means for interconnecting the two above mentioned means in such manner that the images of the slots travel along said record with a relative speed equal to the normal rate of feed of the film, and means for varying the respective luminous intensities of said images in such manner that the total luminous flux received by said length of the film is constant.

6. A device for reproducing sounds from a film record which comprises in combination, a source of light, an opaque member provided with a plurality of slots, means for causing the images of the slots lighted by said source of light to travel simultaneously behind one another along a limited length of said record, means for varying the amount of light projected onto each of these spots per unit of area thereof in such manner that the total luminous flux received by said length of the film is constant, means for feeding the film and differential means for interconnecting the two above mentioned means so that said images of the slots travel along said record with a relative speed equal to the normal rate of feed of the film.

7. A device for reproducing sounds from a film record, which comprises in combination a source of light, an opaque member provided with a plurality of slots, means for causing the images of the slots lighted by said source of light to travel simultaneously behind one another along a limited length of said record, means for feeding the film, means for interconnecting the two above mentioned means in such manner that the images of the slots travel along said record with a relative speed equal to the normal rate of feed of the film, and means for varying the respective luminous intensities of said images in such manner that the total luminous flux received by said length of the film is constant.

8. A device for recording modified sounds from a film record, which comprises, in combination, a source of light, means for guiding a portion of the film record with respect to said source, means for causing a plurality of light rays from said source to be projected simultaneously and to pass successively over common portions of the record with a relative speed equal to the normal speed of the film, means for varying the amount of light projected onto each of these images per unit of area thereof in such manner that the total luminous flux received by said length of the film is constant, and means disposed on the other side of said portions of the film from said source of light, for recording the luminous intensities of said light rays on a fresh film.

9. A device for reproducing sounds from a film record which comprises, in combination, a source of light, means for guiding a portion of the film record with respect to said source of light, means for causing a plurality of light rays from said source of travel simultaneously behind one another along a limited length of said portion of the record with a relative speed equal to the normal rate of feed of the film, so as to form, on said portion of the film, light spots of uniform width, and means for varying the amount of light projected onto each of said spots per unit of area thereof by said respective rays, in such manner that the total luminous flux received by said length of the film record is constant.

RENÉ HENRI CHARLES MARTY.